C. F. SPARKS.
BAG CLOSING AND TYING MACHINE.
APPLICATION FILED JAN. 12, 1920.
1,425,802.
Patented Aug. 15, 1922.
7 SHEETS—SHEET 5.
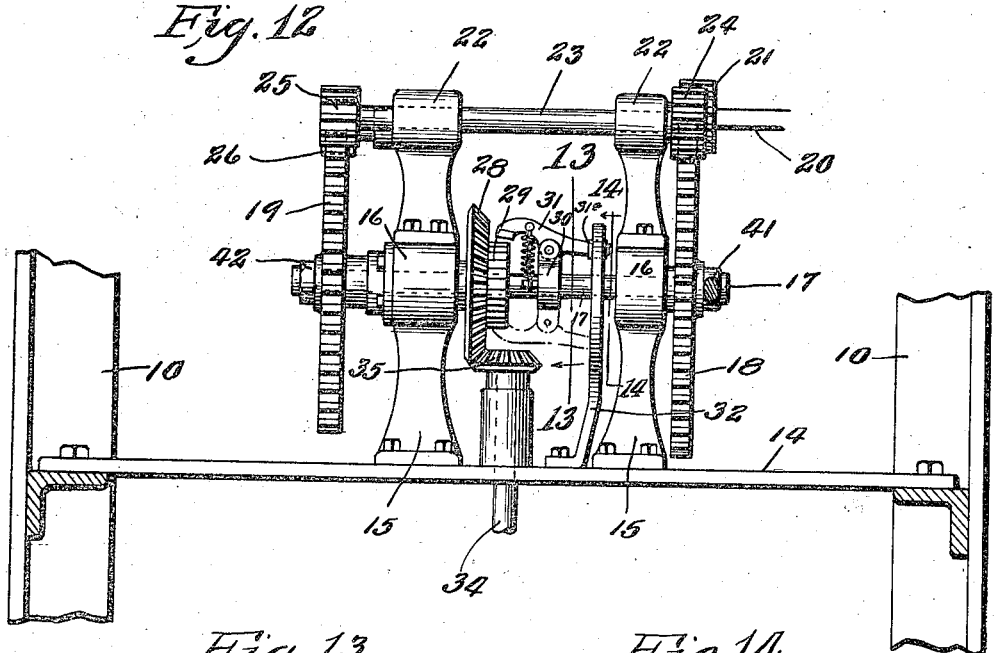
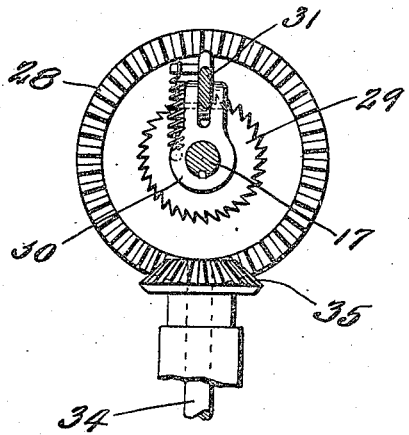
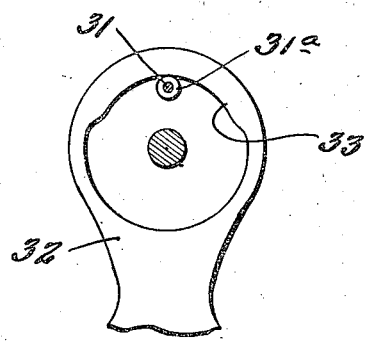
Inventor
Charles F. Sparks

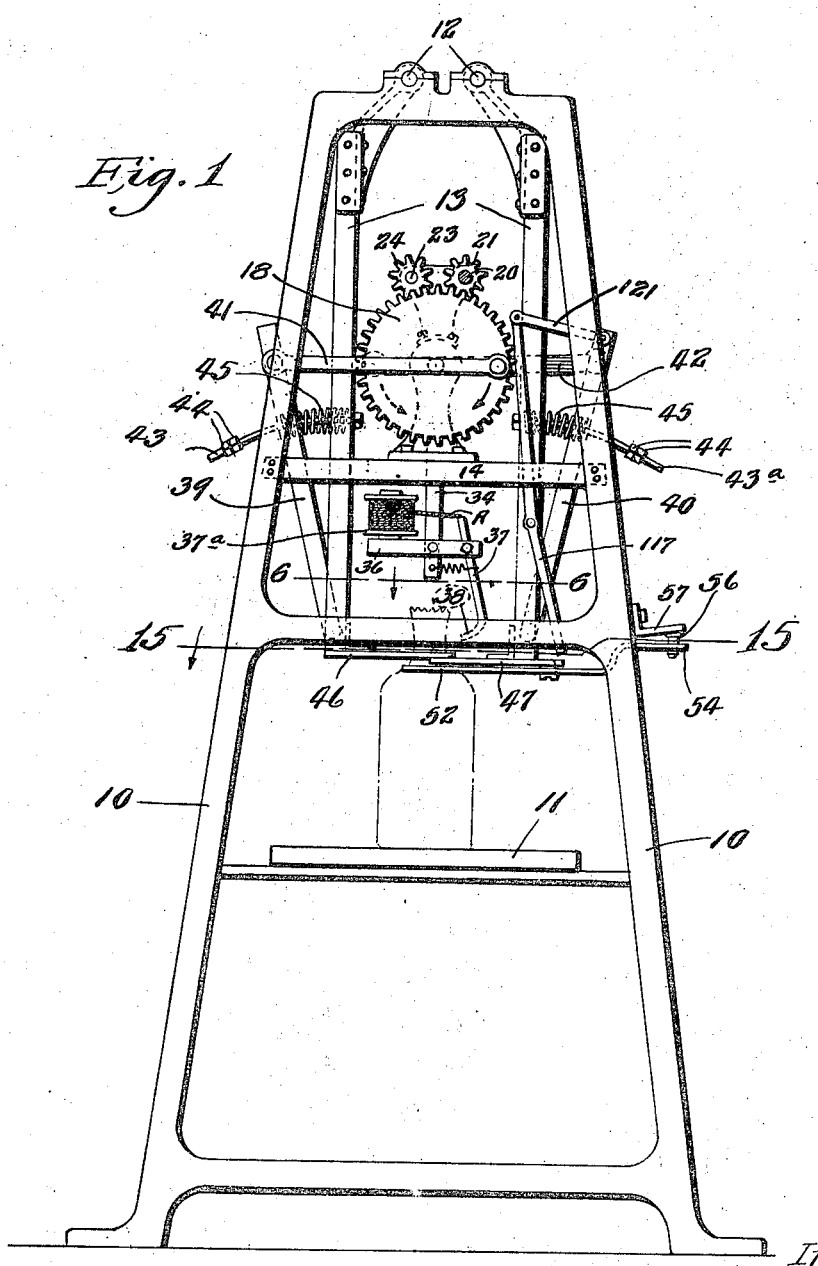

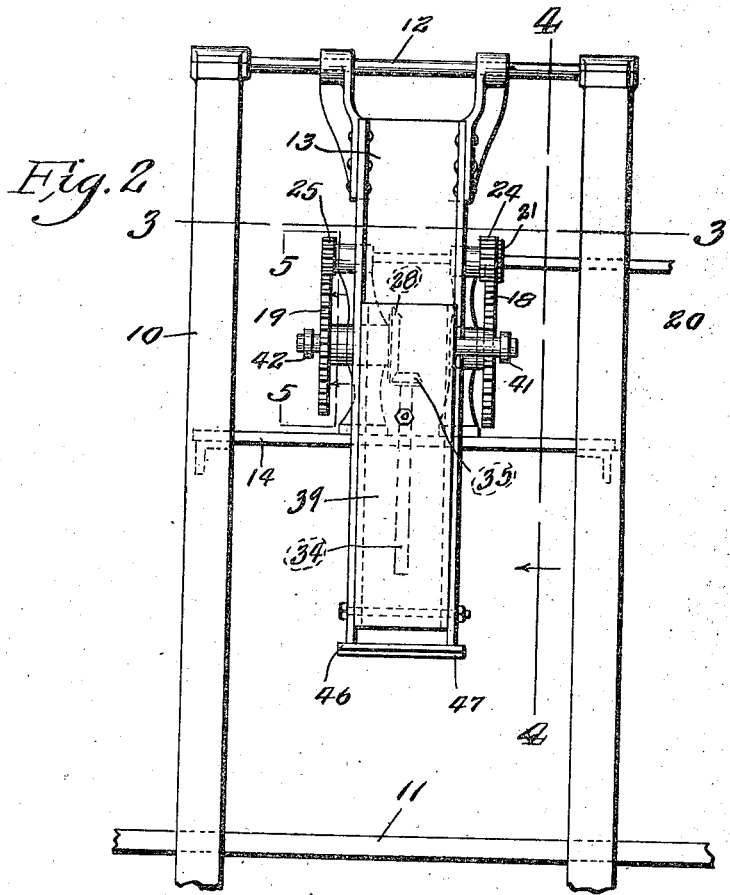

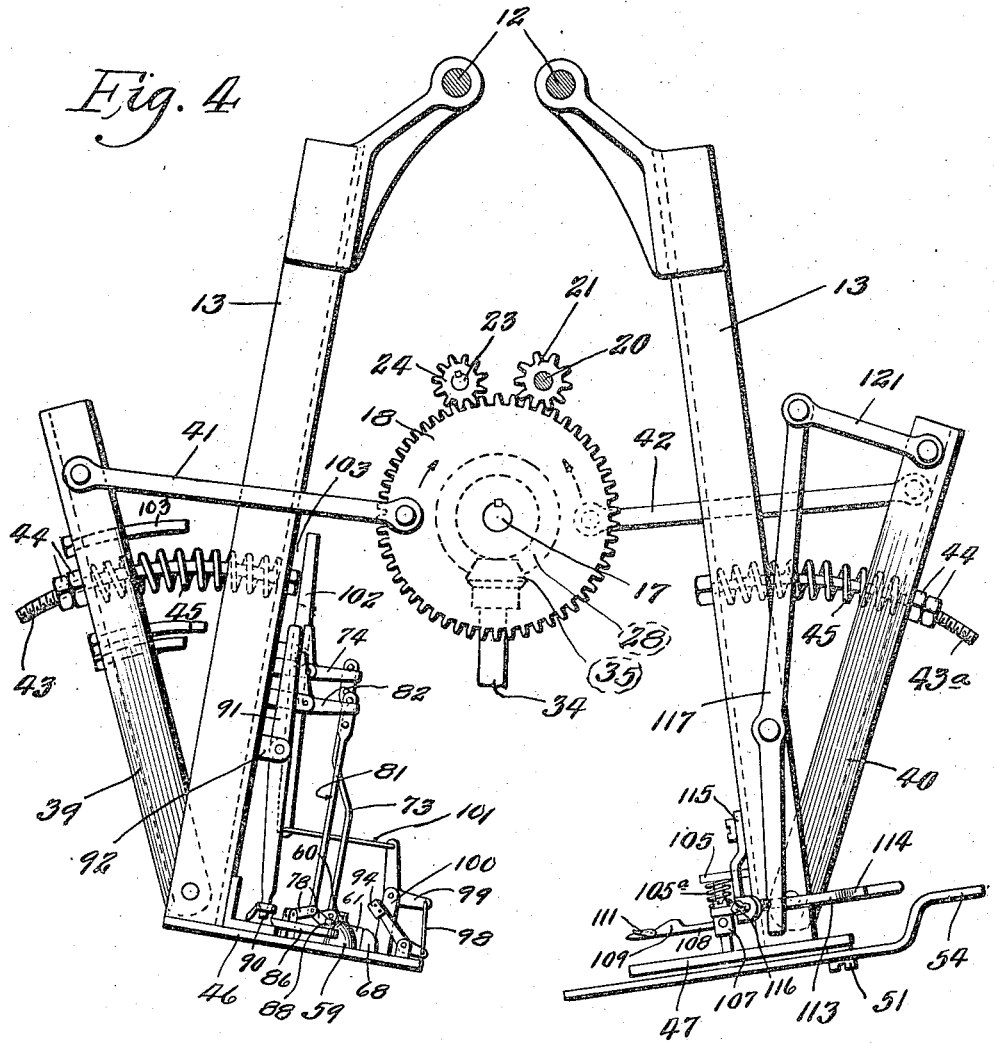

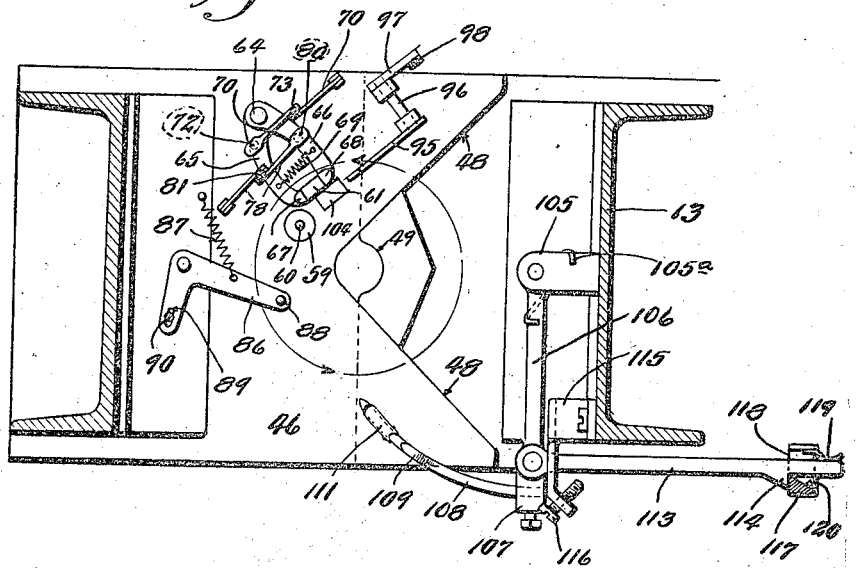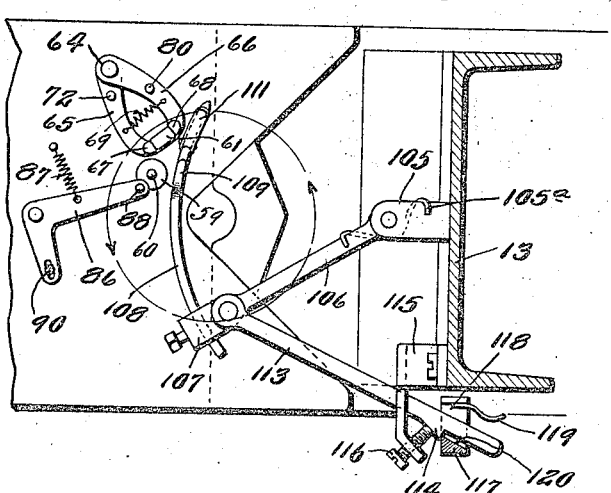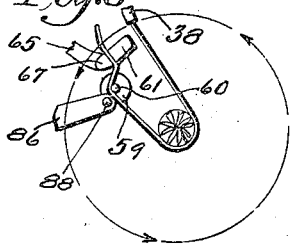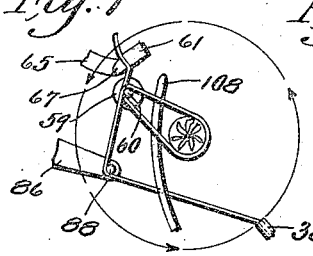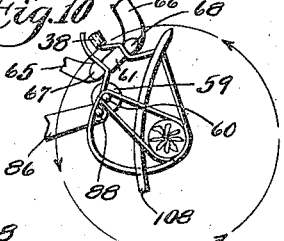

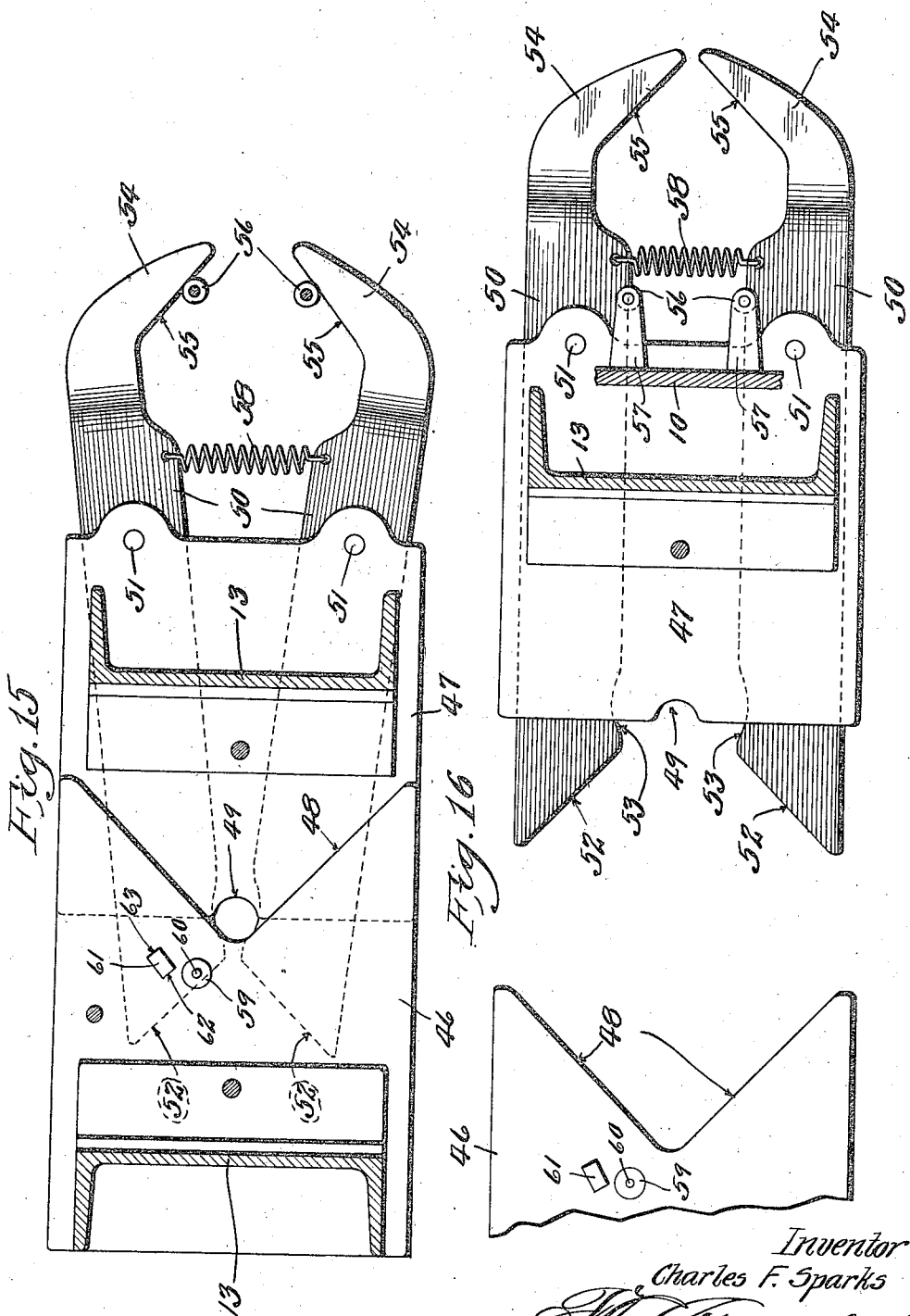

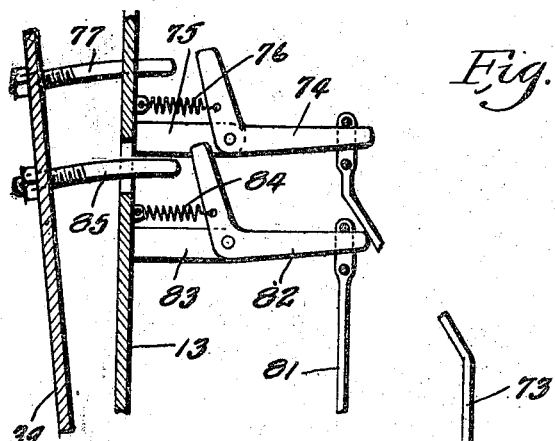
Fig. 17
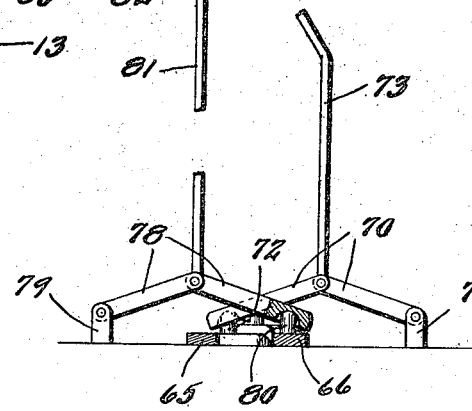
Fig. 18
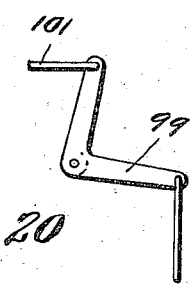
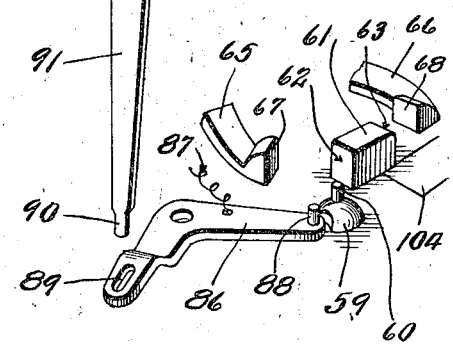
Fig. 20
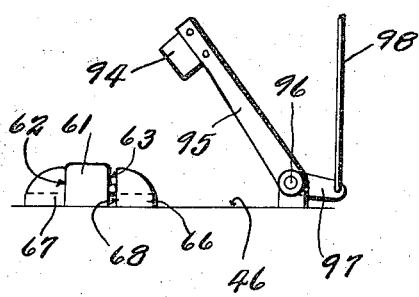
Fig. 19

UNITED STATES PATENT OFFICE.

CHARLES F. SPARKS, OF ALTON, ILLINOIS.

BAG CLOSING AND TYING MACHINE.

1,425,802.　　　Specification of Letters Patent.　　Patented Aug. 15, 1922.

Application filed January 12, 1920. Serial No. 350,916.

*To all whom it may concern:*

Be it known that I, CHARLES F. SPARKS, a citizen of the United States, residing at Alton, Illinois, have invented a certain new and useful Improvement in Bag Closing and Tying Machines, of which the following is a full, clear, and exact description, such as will enable others skilled in the art to which it appertains to make and use the same, reference being had to the accompanying drawings, forming part of this specification.

My invention relates generally to bag closing and tying machines, and more particularly to a machine which, in operation, will automatically contract and close the mouth of a bag, lay a plurality of loops of cord about the contracted or closed portion of the bag, draw said loops tightly upon the closed neck of the bag, form a knot or hitch between the end portions of the loops, and sever the cord at the completion of the tying and knotting operations.

My improved machine is particularly designed for closing and tying the mouths of paper bags utilized as containers for powdered or granular products and substances, such as flour, meal, cement, and the like.

The principal object of my invention is to provide a relatively simple machine which may be operated with comparatively little power and which will be very effective in automatically performing the closing and tying operations.

A further object of my invention is to provide, in a bag closing and tying machine, relatively simple and positively operating mechanisms that are so arranged and timed as to insure the proper operation of the cord handling devices and which latter include the loop and laying means, cord gripping means, the loop tightening means, the knot or hitch forming device, and the cord severing means.

With the foregoing and other objects in view, my invention consists in certain novel features of construction and arrangement of parts, hereinafter more fully described and claimed, and illustrated in the accompanying drawings, in which—

Figure 1 is a front elevational view of a bag closing and tying machine of my improved construction.

Figure 2 is a side elevational view of the machine.

Figure 3 is a horizontal section taken approximately on the line 3—3 of Figure 2.

Figure 4 is an enlarged vertical section taken approximately on the line 4—4 of Figure 2.

Figure 5 is an enlarged vertical section taken approximately on the line 5—5 of Figure 2.

Figure 6 is an enlarged horizontal section taken approximately on the line 6—6 of Figure 1.

Figure 7 is a horizontal section similar to Figure 6 and with certain of the parts in shifted positions.

Figure 8 is a diagrammatic view illustrating the position of cord and certain parts of the cord handling mechanism at the beginning of the loop laying operations.

Figure 9 is a diagrammatic view similar to Figure 8 and showing the cord looped around the closed neck of the bag and held by the cord gripping means.

Figure 10 is a diagrammatic view showing the cord looped around the closed neck of the bag and with the knot tying needle shifted into position to engage said cord.

Figure 11 is a diagrammatic view illustrating the position of the cord holding and knot tying means just prior to the time the cord is severed.

Figure 12 is an enlarged vertical section taken approximately on the line 12—12 of Figure 3.

Figure 13 is an enlarged detail section taken approximately on the line 13—13 of Figure 12.

Figure 14 is an enlarged detail section taken approximately on the line 14—14 of Figure 12.

Figure 15 is an enlarged horizontal section taken approximately on the line 15—15 of Figure 1.

Figure 16 is a horizontal section similar to Figure 15 and with the parts in shifted positions.

Figure 17 is a detail elevational view partly in section and showing the means for actuating the cord gripping means.

Figure 18 is a perspective view of the parts of the cord gripping means.

Figure 19 is a view of the end portion of the knot tying needle.

Figure 20 is an elevational view of the cord severing means.

Referring by numerals to the accompanying drawings which illustrate a practical embodiment of my invention, 10—10 designate a pair of connected upright members which constitute the frame of my improved bag closing and tying machine, and disposed in the lower portion of said frame is a horizontally disposed table or platform 11 upon which the bags to be closed and tied are positioned.

The filled bags to be closed and tied may be delivered onto and removed from this table or platform in any suitable manner.

Journaled in suitable bearings on the upper ends of the members 10 is a pair of shafts 12 and supported thereby and extending downwardly in the frame of the machine are depending members 13 that are preferably channel-shape in cross section and with the marginal flanges outwardly presented. These members which will be hereinafter referred to as arms are arranged to swing simultaneously toward and away from each other and said arms serve as supports for the greater portion of the operating parts of the machine. A supporting plate 14 is fixed to suitable rails on the members 10, said plate extending between the lower portions of the arms 13 and secured to said plate adjacent to and on opposite sides of the center thereof are brackets 15.

Journaled in bearings 16 that are formed on the central portions of the brackets 15 is a shaft 17. Fixed to this shaft and positioned on one end thereof is a gear wheel 18, and loosely mounted on the opposite end of the shaft is a gear wheel 19. A shaft 20 driven by a suitable motor (not shown) carries a pinion 21 that meshes with gear wheel 18 and journaled in suitable bearings 22 that are formed on the upper ends of brackets 15 is a shaft 23, one end of which carries a pinion 24 that meshes with gear wheel 18.

Fixed on the end of shaft 23 opposite the end that carries the pinion 24 is a pinion 25, the same meshing with a pinion 26 that is carried by a stud shaft 27 that projects from the adjacent bracket 15, and this pinion 26 meshes with the loosely mounted gear wheel 19.

By virtue of the driving connections just described, gear wheel 18 and shaft 17 are driven in one direction while loosely mounted gear wheel 19 is driven in the opposite direction.

Loosely mounted on shaft 17 between the brackets 15 is a beveled gear wheel 28 and fixed to the upper face thereof is a ratchet wheel 29. Fixed on shaft 17 adjacent to this ratchet wheel is a collar 30 and pivotally mounted thereupon is a spring-held pawl 31, the forward end of which is adapted to engage the teeth of ratchet wheel 29. The opposite end of this pawl carries a roller $31^a$ that bears directly against the inner periphery of a ring-shaped member 32, the lower end of the latter being fixed to support 14.

This ring-shaped member encircles shaft 17 and its inner periphery is provided with a cam portion 33, the latter extending approximately one-third of the distance around the inner periphery or circumference of said member 32.

Journaled in a suitable bearing on supporting member 14 between the brackets 15 is a vertically disposed shaft 34, the upper end thereof carrying a pinion 35 that meshes with beveled gear wheel 28, and supported by the lower portion of this shaft 34 is a horizontally disposed arm 36, the same serving as a support for a spool $37^a$ that carries the cord A that is utilized in tying the bags.

Pivotally mounted on arm 36 is a spring-held tubular member 37 through which the cord A is adapted to pass and the lower end of this tubular member is bent to form a curved finger 38 from the end of which the cord issues as it is laid around the closed mouth of a bag.

Hinged to the lower end of one of the arms 13 is the lower end of an upwardly and outwardly projecting plate 39 and hinged to the lower end of the other arm 13 is a corresponding plate 40. Connecting the upper portion of plate 39 with a wrist pin on gear wheel 18 is a link 41 and connecting the upper portion of plate 40 with a wrist pin on gear wheel 19 is a link 42. By virtue of the arrangement just described, the arms 13 and parts carried thereby are simultaneously swung toward and away from each other.

Loosely arranged in apertures formed in the arms 13 and plates 39 and 40 are curved rods 43 and $43^a$, the same being concentric with the axes of the plates 39 and 40, and the outer ends of both of these curved rods are threaded in order to receive nuts 44 which bear against the outer faces of the plates 39 and 40. Positioned upon these curved rods and interposed between the arms 13 and plates 39 and 40 are compression springs 45, the normal tendency of which is to swing the plates 39 and 40 away from the arms 13.

Secured in any suitable manner to the lower end of arm 13 to which plate 39 is connected is one of the bag closing plates 46, and carried by the lower end of the other arm 13 is a plate 47 that cooperates with said plate 46 in the bag closing operations. The particular construction of these plates may be more clearly understood by reference to Figures 15 and 16.

The forward end of plate 46 is provided with a V-shaped notch 48 while the front edge of plate 47 is substantially straight and at right angles to the sides of the plate, and formed at the center of said straight edge is a relatively small semi-circular notch 49.

When the plates 46 and 47 are moved toward each other to effect the closing of the bag, the plate 46 lies immediately above plate 47 and when said plates have reached their limit of movement toward each other, the compressed upper portion of the bag is positioned in a relatively small circular opening that is formed between the inner portion of notch 48 and the semi-circular notch 49. (See Fig. 15.)

To assist in the bag closing operations, plate 47 carries on its underside a pair of bag closing fingers 50, the same being pivotally mounted at points 51 adjacent to the rear edge of said plate 47 and the forward ends of said fingers which project slightly beyond the front edge of plate 47 are beveled as designated by 52. The inner edges of the fingers immediately to the rear of these beveled forward ends are provided with notches 53. The rear ends of these fingers are bent upwardly and toward each other as designated by 54 and the inclined inner edges 55 of said inwardly projecting rear portions are adapted to engage against rollers 56, the latter being journaled on a suitable bracket 57 that projects outwardly from the lower portion of the adjacent member 10.

Connecting the rear portions of the fingers 50 is a retractile spring 58, the normal tendency of which draws the rear portions of the fingers together, and thereby spreading the forward ends of said fingers apart.

Positioned on plate 46 adjacent to the inner end of notch 48 is an upwardly projecting conical or rounded lug 59 and projecting upwardly from the apex thereof is a short pin 60. Located on the plate 46 to one side of this lug 59 is a block 61 having straight upright ends 62 and 63. Pivotally mounted on a pin 64 that projects upwardly from plate 46 a short distance away from block 61 are arms 65 and 66, the free end of arm 65 being provided with a head 67 that is adapted to grip the bag tying cord against the end face 62 of lug 61 and the end of arm 66 is provided with a head 68 that is adapted to grip the cord against the end face 63 of said block 61. These arms 65 and 66 are normally pulled toward each other by a retractile spring 69. Arm 65 is swung upon its pivot by means of a pair of toggle links 70, the outer end of one of which is pivotally connected to a block 71 that is fixed to plate 46 and the outer end of the opposite link being pivotally connected to a pin 72 that projects upwardly from said arm 65.

Connected to said toggle link 70 is the lower end of an upright rod 73, the upper end of the latter being flexibly connected to the horizontal arm of a bell crank 74, the latter being fulcrumed to a bracket 75 that projects inwardly from the swinging frame 13 that carries plate 46. A retractile spring 76 is connected to the vertical arm of this bell crank 74 and to the adjacent member 13 and said bell crank is adapted to be swung upon its fulcrum by a push pin 77 that is adjustably seated in the auxiliary frame or swinging member 39 and said pin entering through a suitable aperture in the adjacent frame 13. Arm 66 is swung upon its pivot 70 by means of a pair of toggle links 78, the outer end of one of which is pivotally connected to a lug 79 that is fixed to plate 46 and the outer end of the opposite link being pivotally connected to a pin 80 that projects upwardly from said arm 66.

The lower end of an upright rod 81 is connected to toggle links 78 and the upper end of said rod being flexibly connected to the horizontal arm of a bell crank 82. This bell crank is fulcrumed to a bracket 83 projecting outwardly from the adjacent swinging member 13 and connected to the vertical arm of said bell crank is a retractile spring 84. Bell crank 82 is adapted to be shifted upon its fulcrum by a push pin 85 that is adjustably seated in auxiliary swinging frame 39 and said pin projecting through an opening in the adjacent frame 13.

Fulcrumed on plate 46 adjacent to lug 59 and block 63 is a bell crank 86, the free end of the long arm of which is normally drawn toward lug 59 by a retractile spring 87 and projecting upwardly from the end of the long arm of said bell crank is a relatively short pin 88. Formed in the short arm of this bell crank 86 is a slot 89 and engaging therein is a pin 90 that is formed on the lower end of an upright lever 91. This lever is fulcrumed on a bracket 92 that projects from the adjacent swinging frame 13 and adapted to engage the upper end of said lever and swing the same upon its fulcrum is a push pin 93 that is adjustably seated in auxiliary frame 39 and operates through an opening formed in adjacent frame 13.

The means utilized for severing the tying cord at the completion of the bag closing and tying operations includes a relatively short blade 94 that is carried by an arm 95, the latter being carried by a rock shaft 96 that is journaled in suitable bearings on plate 46. One end of this rock shaft carries a short crank arm 97 and the latter being connected by means of a rod 98 to one of the arms of a bell crank 99. This bell crank is fulcrumed on a standard 100 that projects upwardly from plate 46 and connected to the other one of the arms thereof is a rod 101, the other end of which is connected to the lower end of an upright lever 102. This lever is fulcrumed to a suitable bracket on the adjacent swinging frame 13 and said lever is adapted to be swung on its fulcrum to effect a downward movement of the blade carrying arm 95 by a push rod 103 that is adjustably seated in auxiliary frame 39 and operates through a suitable aperture in the adjacent frame 13.

The blade 94 is adapted to sever the cord at a point immediately in front of the block 61 and head 68 and to provide a relatively soft surface to receive the cutting edge of the blade, a block 104 of wood, fiber or the like is inserted in plate 46 immediately in front of the block 61 and head 68.

Projecting inwardly from the lower portion of swinging member 13 that carries plate 47 is a bracket 105 and pivotally connected thereto is a horizontally disposed arm 106. A spring 105$^a$ is connected to this arm and bracket, and the tendency of said spring is to swing the free end of said arm toward the adjacent frame 13 or to the position as illustrated in Figure 6. The free end of this arm 106 carries a block 107 in which is adjustably arranged the rear end of a knot tying needle 108, the same being curved so that it is concentric with the axis of the arm 106. Formed on top of this needle and near its forward end is an upwardly projecting lug 109 having inclined front and rear ends. Formed in the top of the forward end of the needle is a notch 110 and normally overlying said notch is a spring-held plate 111 that is pivoted at its rear end to said needle and its forward end being curved upwardly as designated by 112.

Pivotally connected to the top of block 107 is the forward end of a horizontally disposed rod 113 and formed on the outer face thereof near its rear end is a triangular lug 114. This rod occupies a plane immediately beneath a bracket 115 that projects laterally from the adjacent swinging member 13, and seated in the depending outer end of this bracket is a screw 116, the point or forward end of which is adapted to engage the outer face of the triangular lug 114. Fulcrumed on the side of swinging frame 13 that carries plate 47 is an upright lever 117, the lower end of which is provided with a horizontally disposed flange 118 upon which rod 113 normally rests, and secured to the end of said flange is a short flat spring 119, the free end of which bears against the edge of rod 113 and tends to force the same toward the lower end of lever 117. That portion of the lever immediately above flange 118 is beveled as designated by 120 and said beveled edge is adapted to engage the inclined face of lug 114. Pivotally connected to the upper end of lever 117 is one end of a link 121, the opposite end of which is pivotally connected to the upper portion of auxiliary swinging frame 40.

The operation of my improved bag closing and tying machine is as follows:

As the driving motor connected to shaft 20 is operated, pinion 21 carried by said shaft will transmit motion to gear wheel 18 fixed on shaft 17, and the rotary motion of the latter is transmitted through pinion 24 to shaft 23, and from thence through pinions 25 and 26 to gear wheel 19. Consequently, the latter rotates simultaneously and at the same rate of speed with gear wheel 18, but said gear wheels rotating in opposite directions. As the gear wheels are thus rotated, connecting rods 41 and 42 swing the main frames 13 and auxiliary frames 39 and 40 simultaneously toward and away from each other.

The springs 45 are relatively stiff so that the main frame and auxiliary frames move together or without movement of the auxiliary frames relative to the main frame, and during the first quarter of the complete revolution of the gear wheels 18 and 19, the main frames 13 swing toward each other so that the plates 46 and 47 occupy horizontal planes with plate 46 immediately over plate 47. Previous to this action, a filled bag is positioned on table or platform 11 and when the plates 46 and 47 are thus brought together, the open neck of the bag will be folded into a relatively small compass and compressed into the small circular opening formed by the inner end of notch 48 in plate 46 and the semi-circular notch 49 in plate 47. This closing and compressing action is assisted by the inclined edges of the notch 48 which tend to force the open portion of the bag toward the center or inner end of said notch, and at the same time as plate 47 moves forward, the beveled edges 55 on the upwardly bent rear ends 54 of the fingers 50 will strike against the rollers 56, and as a result, the forward ends of said fingers will be forced toward each other, thereby materially assisting in the contracting and closing of the neck of the bag. As the forward ends of the fingers are thus swung toward each other, the side portions of the bag are engaged in the notches 53 and gradually compressed and contracted into a relatively small compass. (See Fig. 15.)

At the end of the first quarter revolution of the gear wheels 18 and 19, the main frames 13 occupy vertical positions, but the auxiliary frames 39 and 40 have not yet begun their movement toward said main frames.

During the second quarter of the revolution of the gear wheels 18 and 19, auxiliary frames 39 and 40 are swung upon their pivot points so that their upper ends move toward the main frames 13, such action compressing the springs 45 and moving the various push pins or fingers that are carried by said auxiliary frames through the main frames so as to engage and actuate the various levers and bell cranks that form parts of the cord gripping and knot tying mechanisms, and which various operations are hereinafter more fully described.

The third quarter revolution of the gear wheels 18 and 19 permits the auxiliary frames 39 and 40 to swing outward to their normal positions under the expansive action of springs 45, but during this third quarter, the main frames 13 maintain their upright substantially parallel positions and with plate 46 positioned immediately over plate 47.

During the fourth quarter revolution of the gear wheels 18 and 19, the main frames 13 will be swung apart or to the position as illustrated in Figure 4, and the bag closing, cord laying, knot tying, and cord severing operations having been effected, the closed and tied bag is now removed from position between the plates 46 and 47 and another bag placed in position to be closed and tied.

Thus the continuous rotary motion of the motor driven shaft is utilized for swinging the main frames together to close the bag and said frames and the bag closing means maintain such positions while the cord is being laid in loops around the closed neck of the bag and while said cord is being tied and severed.

The means utilized for laying the loops of cord around the closed neck of the bag will now be described, the greater part of this mechanism being illustrated in Figures 12 to 14 inclusive.

As hereinbefore described, vertical shaft 34 carries cross arm 36 on which is mounted a core carrying spool and a tubular member 37, the curved lower end of which latter is adapted to travel in a circle around the closed neck of the bag immediately above the plane occupied by plate 46, while the same is at its inward limit of movement or as illustrated in Figure 1. Beveled gear wheel 28 is loose on shaft 17 and constantly in mesh with pinion 35. Collar 30 is fixed on shaft 17 and therefore it carries pawl 31 with it during its rotary movement. While roller 31ª on the rear end of pawl 31 is riding on the high or cam portion 33 of ring 32, the point of said pawl is disengaged from ratchet wheel 29, and consequently the rotary motion of shaft 17 is not transmitted to said ratchet wheel and the gear wheel 28 until the roller 31ª rides off the cam surface 33. As soon as this action takes place, the pawl 31 in its shifted position locks the ratchet wheel 29 to shaft 17 to rotate therewith and consequently the rotary motion of said shaft is transmitted through gear wheel 28 to pinion 35 and which latter is fixed on shaft 34. This rotary motion continues until shaft 34 has made two complete revolutions thereby laying two loops of cord around the closed neck of the bag, said cord passing downward through the tubular member 37 and feeding from the lower end thereof. The end of the cord that leads from the lower end of tubular member 37 is gripped between block 61 and head 67 as hereinafter more fully described.

Following the two complete revolutions of the cord laying shaft 34, the roller 31ª rides onto the high portion 33 of the cam, thereby disengaging the pawl 31 from ratchet wheel 29 and the cord laying mechanism ceases to operate until the roller again rides onto the high portion of the cam during the succeeding cycle of operations. The parts are proportioned so that the shaft 34 and cord laying parts carried thereby makes two complete revolutions during about five-twelfths of a complete revolution of shaft 17, and the loop laying operations are effected immediately after the plates 46 and 47 have been brought together and during the first part of the movement of the auxiliary frames 39 and 40 toward the main frames 13 and which movements of the auxiliary frames bring about an actuation of the cord engaging devices carried by plate 47.

The holding of the tying cord, the laying of the loops, the formation of the hitch of knot, and the severing of the cord will now be described.

At the beginning of each loop laying operation, the cord extends from the curved lower end of tubular member 37 to the end of block 61 and the bight of said cord adjacent to its end is gripped between said block and head 67, said cord having been severed at the conclusion of the preceding loop laying operations by the blade 94 and the operation of which latter will be hereinafter more fully described. As the bag closing plates 46 and 47 reach their closed positions, the cord laying member 37 starts on its revolving movements about the closed neck of the bag and the lower end of said member 37 travels in a circular path as illustrated by dotted lines in Figures 8 to 11 inclusive.

The bight of the cord is carried once around the closed neck of the bag with said cord overlying the conical member 59 and bearing against pin 60 as illustrated in Figure 8. As this first loop of the cord is laid it rides over the heads 67 and 68 and block 61 without being engaged thereby for the reason that at the time the cord is carried over said heads and block, the heads are closed against the block and as above described, the end of the cord is gripped between head 67 and block 61. As the movement of the cord laying arm continues, a second loop is laid about the closed neck of the bag with said second loop engaged by the pins 60 and 88, the latter carried by bell crank 86. While the latter part of this second loop is being laid, the tying hook 108 starts on its inward movement over plate 46 and in such movement, it passes beneath a portion of the cord forming the first loop and over a portion of the cord forming the second or top loop, and as the movement of the needle continues, the lug or fin 109 raises the cord forming the upper loop about the pins 60 and 88, thereby providing a sufficient amount of slack that is to be taken up by the return movement of the hook. As the hook reaches its final limit of movement, or as illustrated in Figures 7 and 10, that portion of the cord forming the end of the second loop and extending to the tubular member 37 passes between the hinged member 111 and the point of the hook and engages in the notch or recess 110 in said hook.

An instant prior to the completion of the second loop, arms 65 and 66 will be actuated to move heads 67 and 68 away from block 61, thereby releasing the end of the cord which was clamped between head 67 and block 61 at the beginning of the first loop and the bight of the cord at the end of the second loop will be carried first between head 68 and block 61 and immediately thereafter between head 67 and block 61, after which arms 65 and 66 will return to their normal positions so that the heads 67 and 68 will clamp the bight of the cord at the completion of the second loop. Upon the return of the hook, the hinged member 111 prevents the other portions of the cord from catching in the recess or notch 110 and the loop or portion of the cord engaged in said notch is drawn outwardly away from the neck of the bag as illustrated in Figure 11.

Inasmuch as that portion of the cord just beyond the end of the second loop is clamped by heads 67 and 68 against block 61, that portion of the cord engaged by the hook will slide freely through the notch 11, thereby taking up all slack in the two loops and drawing the same tightly about the neck of the bag. As the hook reaches the end of its rearward movement, arm 95 is actuated so as to swing blade 94 downward, thereby cutting the cord adjacent to block 61 and head 68. At this period in the cycle of operations, the bight of the cord at the end of the second loop is cut and the end of the cord that is clamped against block 61 by heads 67 and 68 leads from said head 67 to the end of the tubular member 38, and thus the parts are ready for the succeeding loop laying operations. A loop of the cord still remains engaged in the notch 110 of the hook, and as the tied bag is removed to make place for a succeeding open bag, the hook pulls the end of the cord through the loops around the neck of the bag, thereby changing the knot from a loop or bow-knot to a complete double-half hitch.

The conical lug 59 carrying the pin 61 is effective in holding the cord so that the tying hook passes beneath one of the loops and moves into position to engage the end of the second loop, whereby it may be drawn backward as the hook returns to its normal position. The pin 88 carried by the bell crank 86 holds the cord after it has been engaged by the pin 61 on conical member 59 and holds the bight of the cord so as to permit the hook to move over this particular part of the cord. Motion is imparted to the hook 108 through lever 117 and which latter is swung upon its fulcrum as frame 40 swings outward. As lever 117 is thus actuated, flange 118 engages lug 114 on rod 113, thereby moving the same inwardly and causing the hook to travel forward to engage in the cord as hereinbefore described. At the completion of this movement, lug 114 will strike against screw 116, thereby swinging the rear end of rod rearwardly upon flange 118, and the power stored in coil spring 107 will act to immediately restore the hook to its normal position and rod 113 will move outwardly upon flange 118. Thus a relatively quick rearward or return movement of the tying hook 108 is effected and when lever 117 swings back to its normal position, spring 119 will act to shift rod 113 so that the lug 114 thereupon will engage behind the lower end of lever 117, as illustrated in Figure 6.

A bag closing and tying machine of my improved construction is comparatively simple, can be operated with comparatively little power, operates with comparative rapidity, and is very effective in accomplishing its intended functions.

It will be readily understood that minor changes in the size, form and construction of the various parts of my improved bag closing and tying machine can be made and substituted for those herein shown and described, without departing from the spirit of my invention, the scope of which is set forth in the appended claims.

I claim:

1. In a bag closing and tying machine, a pair of horizontally disposed plates arranged to move toward each other so that one plate overlaps the other, the front end of one of said plates being notched, and a pair of closing fingers carried by the other plate and adapted to move toward each other.

2. In a bag closing and tying machine, a pair of horizontally disposed plates arranged to move toward and away from each other, the front end of one of said plates being notched, a pair of closing fingers pivotally arranged on the other plate, and means for moving the forward ends of said fingers toward each other as the plates approach each other.

3. In a bag closing and tying machine, a pair of substantially upright frames pivotally supported adjacent to their upper ends, horizontally disposed plates carried by the lower ends of said frames, the forward end of one of said plates being notched, and a pair of movable bag engaging and closing fingers carried by the other plate.

4. In a bag closing and tying machine, a pair of substantially upright frames pivotally supported adjacent to their upper ends, horizontally disposed plates carried by the lower ends of said frames, the forward end of one of said plates being notched, a pair of movable bag engaging and closing fingers carried by the other plate, and means for moving said bag engaging fingers toward each other as the plates move toward each other.

5. In a bag closing and tying machine, a pair of substantially upright frames pivotally mounted near their upper ends, plates carried by the lower portions of said frames, the forward end of one of said plates being notched, a pair of bag engaging and closing fingers pivotally arranged on the other plate, and means for swinging said frames simultaneously toward and away from each other.

6. In a bag closing and tying machine, a pair of substantially upright frames pivotally mounted near their upper ends, plates carried by the lower portions of said frames, the forward end of one of said plates being notched, a pair of bag engaging and closing fingers pivotally arranged on the other plate, means for swinging said frames simultaneously toward and away from each other, and means for swinging the forward ends of the bag closing fingers toward each other as the frames and plates swing toward each other.

7. In a bag closing and tying machine, a pair of horizontally disposed plates arranged to move toward each other so that one plate overlies the other, one of said plates being provided with a bag receiving notch, a pair of bag closing fingers mounted for operation on the other plate, means for laying a plurality of loops of cord around the neck of a bag engaged by the notched plate and fingers, and means for tying the ends of the cord forming said loops.

8. In a bag closing and tying machine, a pair of horizontally disposed plates arranged to move toward each other so that one plate overlies the other, one of said plates being provided with a bag receiving notch, a pair of bag closing fingers mounted for operation on the other plate, means for laying a plurality of loops of cord around the neck of a bag engaged by the notched plate and fingers, means for tying the ends of the cord forming said loops, and means for severing the cord after the tying of the knot has been effected.

9. In a bag closing and tying machine, the combination with means for closing the mouth of a bag which means includes a pair of plates arranged to move toward each other so that one plate overlies the other, of means for laying a plurality of loops of cord around the neck of the closed bag, means for gripping the end of the cord and the bight thereof adjacent to said loops, means for drawing said loops taut, and means for tying a knot in the cord adjacent to said loops which cord gripping means, cord drawing means, and knot tying means are carried by the overlying plate.

10. In a bag closing and tying machine, the combination with means for closing the mouth of a bag which means includes a pair of plates arranged to move toward each other so that one plate overlies the other, of means for laying a plurality of loops of cord around the neck of the closed bag, means for gripping the end of the cord and the bight thereof adjacent to said loops, means for drawing said loops taut, and tying a knot in the cord adjacent to said loops, and means for severing said cord adjacent to the knot, said cord gripping means, loop drawing means, knot tying means, and cord severing means are carried by the overlying plate.

11. In a bag closing and tying machine, a pair of substantially upright frames pivoted near their upper ends and arranged to swing toward and away from each other, bag engaging and closing means carried by the lower portions of said frames, a vertically disposed rotatably mounted shaft arranged between said frames, and a cord laying finger carried by said shaft and adapted to pass around the neck of a bag engaged by the closing means.

12. In a bag closing and tying machine, a pair of substantially upright frames pivoted near their upper ends and arranged to swing toward and away from each other, bag engaging and closing means carried by the lower portions of said frames, a vertically disposed rotatably mounted shaft arranged between said frames, a cord laying finger carried by said shaft and adapted to pass around the neck of a bag engaged by the closing means, a driving shaft, and operating connections between said shaft and the swinging frames and the vertically disposed shaft.

13. In a bag closing and tying machine, a pair of bag engaging and closing plates mounted to move toward and away from each other, means for laying a plurality of loops of cord around the closed neck of the bag positioned between the plates, a pair of closing fingers associated with one of the plates, means carried by the same plate for gripping the cord forming the loops to draw said loops taut around the neck of the bag, means for severing the cord mounted on the plate that is opposite the plate carrying the fingers, means for actuating the gripping means to pull the loops taut, means for actuating the plates to move the same toward and away from each other and for actuating the cord laying means and cord gripping means in proper timed relation to each other.

14. In a bag closing and tying machine, a pair of substantially upright frames adapted to swing toward and away from each other, bag closing plates carried by the lower portions of said frames, means for laying a plurality of loops around the closed neck of a bag projecting upwardly between said plates, means on one of said plates for gripping portions of the cord laid about the neck of the bag, means on the other one of said plates for tying the cord around the neck of the bag, and means cooperated with the upright frame for actuating the cord gripping and tying means.

15. In a bag closing and tying machine, a pair of bag engaging and closing plates adapted to move toward and away from each other, means for laying loops of cord around the neck of a bag that is engaged and closed by said plates, means on one of said plates for gripping portions of the cord, an upwardly projecting member on the plate adjacent to said gripping means for holding the loops of cord one above the other, and operable means on the other one of the plates for engaging a portion of the cord and drawing the same between the loops and then drawing the loops taut about the closed neck of the bag.

16. In a bag closing and tying machine, a pair of plates adapted to move toward each other so that one plate overlaps the other, the forward edges of said plates being notched for cooperation to engage and close the mouth of the bag, means for laying loops of cord about the closed neck of the bag, a hook adapted to pass between the loops of cord around the neck of the bag and engage the bight of the cord and draw the same rearwardly between said loops, means for imparting forward movement to said hook, which means is releasable at a predetermined point in the travel of said hook, and a spring for imparting rearward movement to said hook upon its release.

In testimony whereof I hereunto affix my signature this 30th day of December, 1919.

CHARLES F. SPARKS.